US011261066B2

(12) United States Patent
Yilmaz et al.

(10) Patent No.: US 11,261,066 B2
(45) Date of Patent: Mar. 1, 2022

(54) SPARE TIRE WINCH WITH AUTOGENOUS TIRE LOWERING MECHANISM AND LOCK

(71) Applicant: CAVO OTOMOTIV TICARET VE SANAYI ANONIM SIRKETI, Kocaeli (TR)

(72) Inventors: Mustafa Yilmaz, Kocaeli (TR); Erol Can Yalcin, Kocaeli (TR); Umur Sezer Saritas, Kocaeli (TR); Ovgu Yagiz Cicek, Kocaeli (TR); Nil Nisa Dede, Kocaeli (TR)

( * ) Notice: Subject to any disclaimer, the term of this patent is extended or adjusted under 35 U.S.C. 154(b) by 0 days.

(21) Appl. No.: 16/467,238

(22) PCT Filed: Mar. 8, 2018

(86) PCT No.: PCT/TR2018/050086
§ 371 (c)(1),
(2) Date: Jun. 6, 2019

(87) PCT Pub. No.: WO2019/172857
PCT Pub. Date: Sep. 12, 2019

(65) Prior Publication Data
US 2021/0323615 A1     Oct. 21, 2021

(51) Int. Cl.
*B66D 1/58*     (2006.01)
*B62D 43/04*    (2006.01)
*B66D 3/02*     (2006.01)

(52) U.S. Cl.
CPC ............. *B66D 1/58* (2013.01); *B62D 43/045* (2013.01); *B66D 3/02* (2013.01)

(58) Field of Classification Search
CPC ........ Y10T 70/5987; B66D 3/14; B66D 3/16; B66D 3/02; B66D 1/58; B66D 1/16; B66D 1/54; B66D 5/00; B62D 43/045
(Continued)

(56) References Cited

U.S. PATENT DOCUMENTS 3,836,121 A * 9/1974 Jones ...................... B66D 5/00
                                                         254/340
3,856,167 A * 12/1974 Yasue ................... B62D 43/045
                                                         414/463
(Continued)

FOREIGN PATENT DOCUMENTS

CN     207002094 U      2/2018
DE     19834539 A1 *    2/2000   ............... B66D 1/04
(Continued)

OTHER PUBLICATIONS

International Search Report for PCT/TR2018/050086.

*Primary Examiner* — Gregory W Adams
(74) *Attorney, Agent, or Firm* — Egbert, McDaniel & Swartz, PLLC

(57) ABSTRACT

A spare tire winch mechanism which performs the steps of lowering the spare tire from its location and locating the flat tire on this location via a rope winding assembly. A worm gear and a threaded drum prevent the rope from winding onto the threaded drum in an overlapping and irregular manner which results in locking of the parts and the damage to the parts due to the application of extreme force during the winding. The spare tire performs free fall movement with its own weight as a result of the tire wrench being activated with a pulling force applied perpendicular to the floor axis and the worm gear disconnects from the drum body, in case one of the tires of the motor vehicle needs to be changed.

8 Claims, 4 Drawing Sheets

(58) Field of Classification Search
USPC .............................. 414/462–466; 224/42.21
See application file for complete search history.

(56) References Cited

U.S. PATENT DOCUMENTS

| | | | |
|---|---|---|---|
| 4,613,273 A | 9/1986 | Wagner | |
| 4,625,946 A * | 12/1986 | Clark, Jr. ................. | B66D 5/24 |
| | | | 254/274 |
| 5,368,280 A | 11/1994 | Ng | |
| 8,517,658 B2 * | 8/2013 | Tarabuso ............. | B62D 43/045 |
| | | | 414/463 |
| 2005/0133774 A1 * | 6/2005 | Long ........................ | B66D 1/16 |
| | | | 254/365 |

FOREIGN PATENT DOCUMENTS

| | | | | |
|---|---|---|---|---|
| TR | 2004/02296 | 5/2009 | | |
| WO | WO-2010034723 A1 * | 4/2010 | ............ | B62D 21/20 |
| WO | 2017/191606 A1 | 11/2017 | | |

* cited by examiner

SPARE TIRE WINCH WITH AUTOGENOUS TIRE LOWERING MECHANISM AND LOCK

TECHNICAL FIELD

The invention relates to a spare tire winch mechanism which enables the spare tire to be taken out from its location and be replaced by the flat tire in the same location, in case one of the tires become unusable in motor vehicles (commercial and light commercial vehicles).

The invention specifically is related to a spare tire winch mechanism which enables performing the steps of the spare tire to be taken out of its location and replacing it with the flat tire in an easier manner and in shorter amount of time due to a gear mechanism, enables the spare tire to be lowered to the floor in a controlled manner due to free fall movement, which comprises structurings enabling the rope to be irregularly wound around the drum overlapping and preventing any damage that may occur to the parts due to the application of excessive force during winding.

PRIOR ART

In most of the motor vehicles which move on wheels, especially in commercial and light commercial vehicles, have a spare tire tank located in the rear back section in the trunk section of the vehicle. There is a spare tire (wheel) inside the said spare tire tank, this spare tire is used in case one of the wheels of the vehicle become unusable due to any reason. When needed, the spare tire is taken out of the spare tire tank and the malfunctioning tire which is changed is located in the spare tire tank as a replacement.

In prior art, many different types of winch mechanisms are developed for the purpose of spare tire change. Operation principle of the current winch mechanisms is based on the rotating of the winch mechanism by human force via a crowbar and therefore lowering the tire, to which the winch rope is connected, to the vehicle floor and afterwards rotating the crowbar in reverse direction in order to pull the flat tire into the vehicle (into spare tire tank).

In the existing winch mechanisms, the crowbar rotates the drum directly and therefore the winch rope is wound to the drum body. There are two types of drum winding methods. In the first one, winch rope is wound to the drum overlapping. In such structuring, breaks and/or undesired locking occur in the drum part to which the rope is wound because of the irregular winding of the winch rope, winch rope being overlapped and being stuck inside the mechanism during use. This limits the life of mechanism and also create greater difficulties to the driver in case of a malfunction.

In the second method, the winch rope is wound to the drum via a helical form. This method prevents the irregular winding of the rope and eliminates the breaks/undesired locking problems that are encountered in the first winding method. However; drums of this type require a greater volume in comparison to the drums which perform overlapping winding.

The existing winch mechanisms lower the spare tire by rotating the rope that wind to the drum via a crowbar.

In the application with number U.S. Pat. No. 4,613,273A, which is found in the patent research regarding the subject; an apparatus is mentioned which assists the loading, holding and lowering of a spare tire equipment that is mounted to the bottom of the vehicle such as a truck etc. The device comprises a winch, an electric motor, a connection structuring for connecting the winch and motor operationally and an electric circuit which allows the motor and the winch to be operated only by an authorized personnel.

In the patent research regarding the subject, an invention with application number TR200402296 is found. The invention relates to a spare tire winch and it is stated in the published abstract section that: "The invention relates to a spare tire winch carrier in vehicles that is developed for lowering the spare tire from its location and lifting it up to the same location and fix it. In the spare tire winch carrier that is developed to achieve the aims of the invention, the assembly located in the spare tire winch carrier is passed through the rectangular hole on the carrier holder and is connected to the holder after the zamak elbow is passed through the rectangular hole and rotated 90°, and it does not dislocate since its direction on the vehicle does not alter. The section below the zamak elbow enables the elbow rotate during the crash of the vehicle and prevent it dislocating from the assembly carrier holder and cancels the tire in order to prevent any danger".

Again, the invention with application number TR200400417, has spare tire carrier title. In the abstract section of the invention it is stated that; "The present invention a spare tire carriers with winch which is developed to be used especially in truck and trailer group vehicles, which comprises main carrier L profiles that are mounted to the vehicle chassis, a gear mechanism that is fixed on these main carrier profiles, a pulley system coupled to the said gear mechanism and a wheel rim carrier that is connected to the wheel to be carried. The spare tire carriers comprises a carrier shaft which carries the spare tire load that is carried by lifting and which directly is formed a bearing to these profiles."

When the abovementioned inventions are examined, it can be seen that they do not comprise a mechanism enabling a controlled free fall during the stage of lowering of spare tire.

As a result, developments in spare tire winch mechanisms are needed and therefore novel structurings which eliminate the disadvantages mentioned above and provide solution to the current systems are required.

Aim of the Invention

The present invention is related to a spare tire winch mechanisms which fulfills the abovementioned needs, eliminates all of the disadvantages and provides some additional advantages.

The main purpose of the invention is to aim to activate the crowbar by a pulling force applied perpendicularly to the floor axis when the spare tire is desired to be lowered from the vehicle, and to reduce the amount of time required for lowering the spare tire and pulling the flat tire when compared to the current system, since the spare tire shall perform a free fall movement with its own weight as a result of worm gear being disconnected from the drum.

Another aim of the invention is to prevent the winch rope being wind overlappingly and being stuck and prevent the damage to and breaking of the drum due to this sticking, by the virtue of the groove forms that are created on the drum body, made of plastic material.

In order to fulfill all the advantages mentioned above and shall be understood by the detailed description below the present invention is a spare tire winch mechanism; which comprises rope winding assembly enabling the spare tire to be dislocated from its location; enabling the rope, to which the spare tire is connected, wind in upwards and downward direction by being rotated by a tire wrench in order to locate the flat tire in the same location from which the spare tire is taken out when one of the tire of the vehicle needs to be changed; a spiral pipe which keeps the rope inside its body, a rope fixation bearing enabling the spare tire connect to the end of the rope, wherein; it comprises, A carrier body which forms a bearing the components of rope winding assembly inside it and protects these against external factors, Front cover, which covers the front side of the said carrier body, A moment shaft which is rotated by the tire wrench and is formed a bearing to the space in the middle of the worm gear, A worm gear, which is located between the moment shaft and threaded drum, which is rotated by the moment shaft that it is connected to and enables the threaded drum rotate by transmitting the rotation movement to the threaded drum, A threaded drum which has helical gears on its body and winds the rope on its body by rotating by the rotating movement that it receives from the worm gear it is connected to, A internal bearing, which is located between the moment shaft and worm gear, which transmits the rotating movement of the moment shaft to the worm gear by the gears on its body, which enables the moment shaft rotate idle by sliding downwards and disconnects the moment shaft from the worm gear in order to protect the mechanism parts in case an extreme moment is applied to the moment shaft, A pressure spring which is connected to the said internal bearing from the bottom and which enables the internal bearing remain in contact between the moment shaft and worm gear by pushing the internal bearing upwards and which enables the internal bearing slide downwards by being stuck in case an extreme moment is applied to the moment shaft, A holder plate, which is located between the carrier body and the worm gear, which enables the contact of the gear parts by pushing the worm gear towards the threaded drum and keep the tension spring in tension position when it is located and which enables the spare tire, which is connected to the rope wound to the drum gear body, to be lowered to the vehicle floor by its own weight when it is dislocated, A tension spring which is located between the carrier body and the moment shaft and which disconnects the worm gear from the threaded drum by spring force when the holder plate is dislocated.

The structural and characteristical features of the invention along with all its advantages shall be understood more clearly with the figures provided below and the detailed description that refers to these figures. Therefore, an evaluation shall be made by taking these figures and the detailed description into account.

BRIEF DESCRIPTION OF DRAWINGS

In order for the structuring of the present invention and its advantages with its extra elements to be understood in the best manner; an evaluation shall be done by taking the Figures, of which the description is provided below, into the account.

REFERENCE NUMBERS

Figure 1:
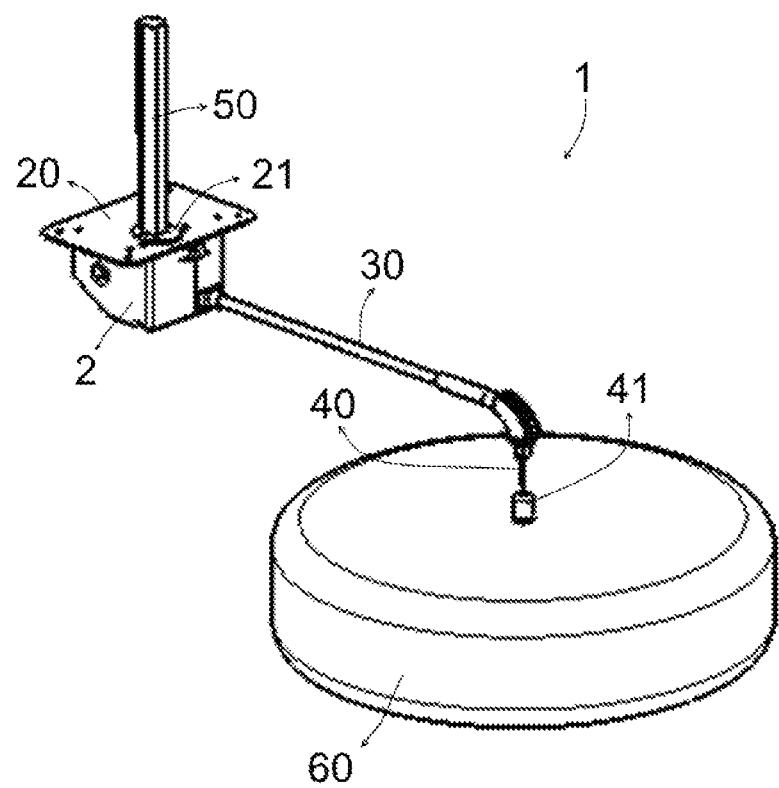
FIG. 1; is a perspective view of the spare tire winch mechanism of the invention.

1. Spare tire Winch Mechanism
2. Rope Winding Assembly
3. Carrier body
4. Front cover
5. Threaded drum
   5.1. Rope Groove
6. Worm gear
7. Moment shaft
8. Internal Bearing
9. Pressure spring
10. Bottom cover
11. Bearing
12. Tension spring
13. Holder plate
14. Spiral Holder
15. Guiding Bearing
20. Top cover
21. Sealing gasket
30. Spiral Pipe
40. Rope
41. Rope Fixation Bearing
50. Tire wrench
60. Spare tire

DETAILED DESCRIPTION OF THE INVENTION

In this detailed description, the preferred structurings of the spare tire winch mechanism (1) of the invention are described in a non-limiting manner and merely in order for the subject to be better understood.

The invention is a spare tire winch mechanism (1) which enables the spare tire to be taken out from its location and be replaced by the flat tire in the same location, in case one of the tires become unusable for motor vehicles (commercial and light commercial vehicles). Spare tire winch mechanism (1) is mounted in the spare tire tank that is located on the floor of the inside section of the car, behind the trunk cover in the back of the commercial vehicles.

Figure 2:
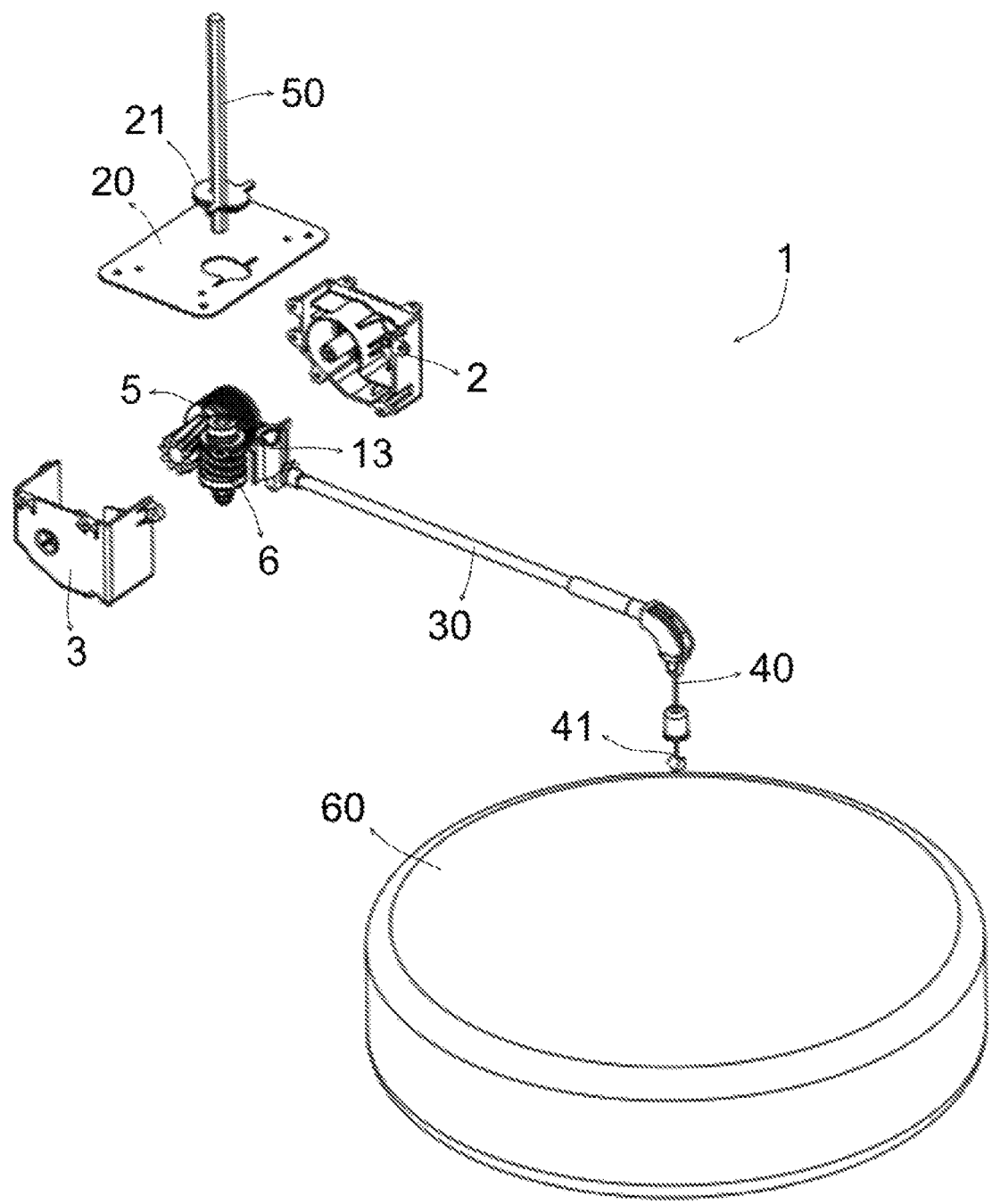
FIG. 2; is a perspective view of the spare tire winch mechanism of the invention in an unmounted manner.

In the FIG. 2, the main components composing the spare tire winch mechanism (1) of the invention are shown in unmounted manner. Accordingly, the spare tire winch mechanism (1) is comprised of;

a steel rope (40) that connects the spare tire (60) to the mechanism and is used for lowering and lifting the spare tire (60), a spiral pipe (30) which protects the said rope (40) from the outer environment and determines the route of the rope to the point the spare tire (60) is located on, a rope winding assembly (2) which enables the lowering of the spare tire (60) to the floor by releasing the rope (40) when the spare tire (60) is taken out from the spare tire tank, when needed; and which collects the rope (40) afterwards and enables the spare tire (60) to be lifted to the spare tire tank, a metal top cover (20), which enables the said rope winding assembly (2) mount to the spare tire tank from bottom via screwing due to the holes on its body and which protects it from outer factors, a tire wrench (50) which enables the rope winding mechanism (2) receive drive by the user, a sealing gasket (21) which is mounted in between the top cover (20) and the tire wrench (50) in order to prevent the entrance of particles inside the rope winding mechanism (2) from top, a rope fixation bearing (41) which enables the spare tire (60) attach to the rope (40).

In FIG. 1, a three dimensional view of the spare tire winch mechanism (1) of the invention is shown.

Figure 3:
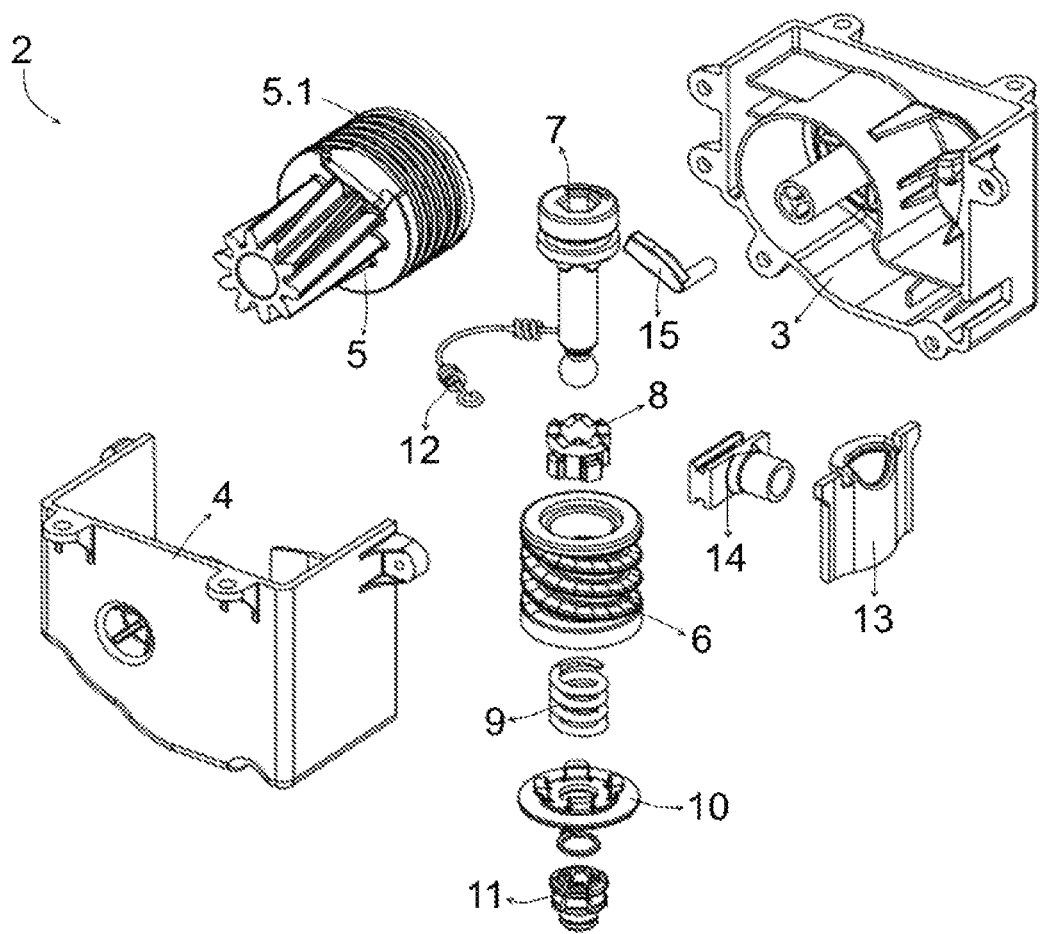
FIG. 3; is a perspective view of the rope winding assembly of the spare tire winch mechanism of the invention in an unmounted manner.

The rope winding assembly (2) in the spare tire winch mechanism (1) of the invention is established inside a front cover (4) that is mounted to a carrier body (3) from the front side via the said carrier body (3). In FIG. 3, the components composing the rope winding assembly (2) in the spare tire winch mechanism (1) of the invention are shown in an unmounted manner. Carrier body (3) and the front cover (4) both protect the components composing the mechanism against external factor and also fixes these components in the internal side and forms them a bearing.

Figure 4:
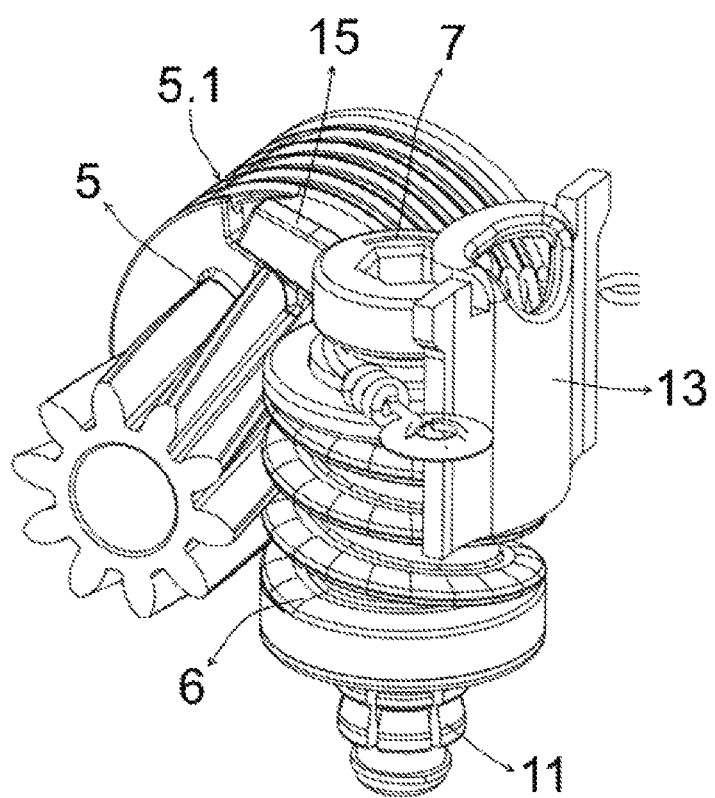
FIG. 4; is a perspective view of the threaded drum and worm gear of the spare tire winch mechanism of the invention.

In the rope winding assembly (2), there is a structuring composed of a threaded drum (5), which rope (40) winds onto its body and a worm gear (6) connected to the said threaded drum (5). Helical gears that are on the bodies of the threaded drum (5) and the worm gear (6) rotate the direction of force in 90 degrees during the rotation movement. A moment shaft (7) is attached to the hole in the middle part of the worm gear (6) which has a cylindrical form. The internal bearing (8) is located between the said moment shaft (7) and the worm gear (6). A tire wrench (50) is put into the housing in the head part of the moment shaft (7). The Internal bearing (8) transmits the rotation movement to the worm gear (6) in the same direction as the moment shaft (7). Internal bearing (8) is connected to a pressure spring (9) from bottom. The pressure spring (9) pushes the internal bearing (8) in upward direction and enables the contact position of the internal bearing (8) between the worm gear (6) and the moment shaft (7). In case a pressure that is above a certain force is applied to the tire wrench (50) and the moment shaft (7) the pressure spring (9) gets stuck and consequently the internal bearing (8) is dislocated from the contact position. In this case, since the contact between the worm gear (6) and the moment shaft (7) is lost, the worm gear (6) will not rotate. The pressure spring (9) is located inside a bottom cover (10) in the bottom part. The said bottom cover (10) prevents the pressure spring (9) get out from the worm gear (6). In FIG. 4, a three dimensional depiction of the threaded drum (5) mounted to the worm gear (6) is provided.

In the rope winding assembly (2), a holder plate (13) and a tension spring (12) are located between the worm gear (5) and the carrier body (3). Out of these components, while holder plate (13) keeps the gears of the worm gear (6) and the threaded drum (5) in contact, the tension spring (12) on the other hand, pulls the worm gear (6) in the reverse direction, in other words in a manner that it loses the contact with the threaded drum (5), via moment shaft (7) by spring force. The manner that the threaded drum (5) with helical gears and the worm gear (6) connect and the location of the holder plate (13) and the tension spring (12) around the worm gear (6) shall be understood more clearly in FIG. 4.

The worm gear (6), moment shaft (7), internal bearing (8), pressure spring (9) and bottom cover (10) in the rope winding assembly (2) are connected from bottom and are mounted to the carrier body (3) by comprises a bearing (11).

The connection of the spiral pipe (30) to the carrier body (3) is provided by a spiral holder (14). An end of the spiral pipe (30) should be attached to the pipe-shaped end of the spiral holder (14) which is mounted to the carrier body (3). By this manner, the entrance of the rope (40) inside the spiral pipe (30) to the rope winding mechanism (2) is performed.

There are rope groves (5.1) on the threaded drum body (5) in order for the rope (40) to be wound in a non-overlapping, regular and orderly manner. In order for the rope (40) to be wound in an orderly manner, there is also a guiding bearing (15) inside the carrier body (3).

The said guiding bearing (15) guides the rope (40) which is pulled to the rope winding assembly (2) through a spiral holder (14) towards the rope grooves (5.1) on the threaded drum body (5).

The Operation Principle of the Spare Tire Winch Mechanism (1) of the Invention is as Follows:

In the spare tire winch mechanism (1), one end of the rope (40) is tied to the threaded drum (5) in the rope winding mechanism (2) while the other end is tied to the spare tire (60) via rope fixation bearing (41).

In order to lower the spare tire (60) which is located inside the housing, which is called spare tire tank, in the vehicle body to the vehicle floor when needed, first, the sealing gasket (21) located on the spare tire winch mechanism (1) is dislocated by the user by using his/her finger. The head part of the holder plate (13) is located right under the sealing gasket (21). Therefore, when the sealing gasket (21) is dislocated, an access to the holder plate (13) is achieved. The user pulls the holder plate (13) upwards by inserting the finger into the head part of the holder plate (13). By this, the holder plate (13) is dislocated. During this step, the tension spring (12), which is located inside the worm gear (6) and is connected to the moment shaft (7) which operates together with the worm gear (6), pulls the moment shaft (7) towards itself. Therefore, the worm gear (6) is pulled via spring force towards the space from which the holder plate (13) is removed and finally the gear contact between the worm gear (6) and the threaded drum (5) is lost. After the gear contact is lost, the spare tire (60) rotates the threaded drum (5), onto which it is connected via the rope (40), by its own weight in its axis. Thus, the spare tire (60) performs a free fall movement and falls onto the vehicle floor by its own weight.

After the tire is changed, in order to pull the flat tire (60) to the spare tire tank inside the vehicle, first, tire wrench (50) is manually attached to the housing that is located in the head part of the moment shaft (7). Afterwards, the moment shaft (7) is tilted to an extent towards the reverse direction of the operation direction of the tension spring (12) and by this the tension spring (12) is tensed. The tension position of the tension spring (12) is kept by the virtue of the tire wrench (50), and the holder plate (13) is located onto its housing on the carrier body (3) by using the other hand. When the tire wrench (50) is positioned in vertical position, the tension spring (12) provides the contact of the worm gear (6) to the threaded drum (5) by the spring force it has.

After this stage, the moment shaft (7) is rotated in counterclockwise direction by the help of the tire wrench (50). When the moment shaft (7) rotates, the same rotation movement is transmitted to the worm gear (6) since the moment shaft is connected to the internal bearing (8) and the worm gear (6), and the worm gear (6) starts rotating as well.

The worm gear (6) starts to rotate the threaded drum (5), which it has a gear contact with. While the helical gears on the worm gear (6) body rotates around the vertical axis, the helical gears on the threaded drum (5) body rotates around the horizontal axis. By this manner, the rotation movement of the worm gear (6) is changed 90 degrees for the threaded drum (5). By the rotation movement of the threaded drum (5), the rope (40) that is connected to the spare tire (60) starts to wind around the body of the threaded drum (5). Meanwhile, the guiding bearing (15) helps the rope (40) wind onto the rope grooves (5.1) on the body of the threaded drum (5).

After the flat tire (60) is pulled to its location inside the vehicle, the tire wrench (50) is rotated until a sufficient compression is obtained between the spare tire tank inside the vehicle and the flat tire (60).

There is a moment limiting system under the worm gear (6) in order to prevent the break of the carrier system components due to extreme moment of the tire wrench (50). This system is comprised of internal bearing (8) and pressure spring (9). The internal bearing (8) which is located under the moment shaft (7) is in continuous contact to the moment shaft (7) due to the gears on its body. The continuous is provided by the pressure spring (9) which is located under the internal bearing (8) and which continuously apply force to the internal bearing (8) in upwards direction.

By this manner, the internal bearing (8) transmits the moment it receives from the moment shaft (7) to the worm gear (6) via the gears it has on its body. If the tire wrench (50) is continued to be rotated after the flat tire (60) is pulled to its location inside the vehicle, the tire wrench (50) is rotated until a sufficient compression is obtained between the spare tire tank inside the vehicle, the moment shall exceed a certain level. The moment force that exceeds the limit would overcome the upward spring force of the pressure spring (9) which applies pressure to the internal bearing (8) and therefore the gears located on the internal bearing (8) body would slip over the gears that are located under the moment shaft (7). Since the contact between the moment shaft (7) and the internal bearing (8) would be lost by this manner, the rotating movement would not be transmitted to the internal bearing (8) and to the worm gear (6), to which the internal bearing (8) is connected and the moment shaft (7) would rotate idle. Consequently, the extreme moment that is applied would not be transmitted to the threaded drum (5) and the worm gear (6) in the rope winding assembly (2) and the carrier system parts would be protected against breaks.

The invention claimed is:

1. A spare tire winch mechanism, which comprises a rope winding assembly which enables the spare tire be taken out of its location and which enables the winding of a rope, to which the spare tire is connected, in upwards and downwards directions by being rotated by a tire wrench, in order to locate a flat tire in the same location from which the spare tire is taken out, a spiral pipe which keeps the rope inside its body, a rope fixation bearing enabling the spare tire connect to the end of the rope, characterized by comprising:

a carrier body which forms a bearing for the components of the rope winding assembly inside it and protects these against external factors, a front cover, which covers a front side of the said carrier body, a moment shaft which is rotated by the tire wrench and forms a bearing to the space in the middle of a worm gear, the worm gear, which is located between the moment shaft and a threaded drum, which is rotated by the moment shaft that it is connected to and enables the threaded drum to rotate by transmitting the rotation movement to the threaded drum, the threaded drum which has helical gears on its body and winds the rope on its body by rotating by the rotating movement that it receives from the worm gear it is connected to, an internal bearing, which is located between the moment shaft and the worm gear, which transmits the rotating movement of the moment shaft to the worm gear by gears on its body, which enables the moment shaft rotate idle by sliding downwards and disconnects the moment shaft from the worm gear in order to protect the mechanism parts in case an extreme moment is applied to the moment shaft, a pressure spring which is connected to the internal bearing from the bottom and which enables the internal bearing to remain in contact between the moment shaft and the worm gear by pushing the internal bearing upwards and which enables the internal bearing to slide downwards by being stuck in case an extreme moment is applied to the moment shaft, a holder plate, which is located between the carrier body and the worm gear, which enables the contact of the gear parts by pushing the worm gear towards the threaded drum and keep a tension spring in tension position when it is located and which enables the spare tire, which is connected to the rope wound to the drum gear body, to be lowered to the vehicle floor by its own weight when it is dislocated, the tension spring which is located between the carrier body and the moment shaft and which disconnects the worm gear from the threaded drum by spring force when the holder plate is dislocated.

2. A spare tire winch mechanism according to claim 1, characterized by comprising: a bearing which connects the worm gear, moment shaft, internal bearing, pressure spring and bottom cover in the rope winding assembly from bottom and enables these to be mounted to the carrier body.

3. A spare tire winch mechanism according to claim 1, characterized by comprising: a bottom cover which forms a bearing on the pressure spring from the bottom and prevents the pressure spring from getting out of the worm gear.

4. A spare tire winch mechanism according to claim 1, characterized by comprising: a top cover which covers the carrier body and the front cover and enables the assembly of the rope winding assembly to be mounted onto the vehicle body.

5. A spare tire winch mechanism according to claim 4, characterized by comprising: a sealing gasket which covers the entrance from the top cover to the tire wrench and enables the user access to the holder plate when it is dislocated.

6. A spare tire winch mechanism according to claim 1, characterized by comprising: a spiral holder which enables the spiral pipe to connect to the carrier body.

7. A spare tire winch mechanism according to claim 1, characterized by comprising: rope grooves in order for the rope to be wound onto the threaded drum body in a non-overlapping, regular and orderly manner.

8. A spare tire winch mechanism according to claim 7, characterized by comprising: a guiding bearing which enables the rope to be wound onto the threaded drum body in an non-overlapping, regular and orderly manner by guiding the rope that is wound onto the threaded drum body towards the rope grooves on threaded drum body.

* * * * *